UNITED STATES PATENT OFFICE 2,347,846

ANTHRAQUINONES CONTAINING TRIFLUO-ROMETHYL GROUPS AND A PROCESS OF PREPARING THEM

Otto Scherer, Frankfort-on-the-Main, Germany, assignor to General Aniline & Film Corporation, New York, N. Y., a corporation of Delaware No Drawing. Application February 6, 1941, Serial No. 377,669. In Germany February 14, 1940

6 Claims. (Cl. 260—384)

The present invention relates to anthraquinones containing trifluoro methyl-groups and to a process of preparing them.

Anthraquinones containing trifluoro methyl-groups have not yet been described in the pertinent literature, this probably being due to the fact that the usual anthraquinone synthesis according to Friedel-Crafts fails on using trifluoro methyl-benzenes.

Now I have found that trifluoro methyl-anthraquinones are readily obtained by reacting compounds of the general formula:

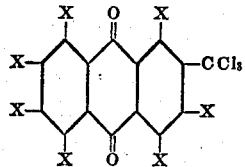

wherein X stands for hydrogen or chlorine, with technically anhydrous hydrogen fluoride, in the presence or absence of organic solvents, at a raised temperature and with application of pressure.

The new compounds may be characterized by the following general formula:

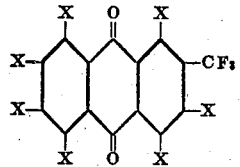

wherein X stands for hydrogen or chlorine. They, therefore, constitute substances which are unsubstituted in the X-positions or substances containing one to seven chlorine atoms in the X-positions. Such substances as contain one or two chlorine atoms are the most important ones. Compounds containing besides the trichloro methyl-group oxygen in the molecule, for instance the trichloromethyl-benzophenones, yield, as is known, resinous products on reacting with hydrogen fluoride. It is, therefore, surprising that the trichloro methyl-anthraquinones which contain even two oxygen atoms in the molecule may be caused to react with hydrogen fluoride with formation of the corresponding trifluoromethyl compounds.

The trichloro methyl-anthraquinones used as starting materials are known substances. They are for instance obtainable according to the processes described in German Patents No. 216,715 or 254,450 and U. S. Patent No. 893,507 by the action of chlorine at a raised temperature on the corresponding methyl compounds.

The treatment with technically anhydrous hydrogen fluoride takes a very ready course and the trifluoro methyl-anthraquinones are obtained in very good yields. The new compounds are important starting materials for the manufacture or vat dyestuffs.

The following examples serve to illustrate the invention, but they are not intended to limit it thereto, the parts being by weight:

(1) 325 parts of 2-trichloromethyl-anthraquinone and 100 parts of technically anhydrous hydrogen fluoride are mixed in an iron vessel resistant to pressure. The vessel is heated to about 100° C.–120° C. Pressure very soon sets in. The hydrogen chloride which has split off is removed through a valve after having passed a cooling apparatus resistant to pressure. The pressure is suitably maintained at 10–15 atmospheres. After 2–3 hours the reaction is complete. The pressure is then released and the excess of hydrogen fluoride is driven off. The product of the reaction is purified by distillation. The 2-trifluoromethyl-anthraquinone is obtained in a yield of about 90 per cent of the theoretical yield in the form of feebly yellow crystals melting at 147° C.–148° C.

(2) 360 parts of 1-chloro-2-trichloromethyl-anthraquinone dissolved in 720 parts of ortho-dichloro-benzene are mixed with 70 parts of technically anhydrous hydrogen fluoride in a vessel resistant to pressure and lined with silver or nickel. The mixture is heated to about 150° C.–180° C. The hydrogen chloride evolved is eliminated through a reducing valve. The pressure is maintained at 15–20 atmospheres. After 3–4 hours the reaction is complete. After cooling the crude product is filtered with suction and recrystallized from glacial acetic acid or benzene. The yield amounts to about 80 per cent of the theoretical yield. The 1-chloro-2-trifluoro methyl-anthraquinone obtained melts at 208° C.–209° C.

(3) From 360 parts of 3-chloro-2-trichloromethyl-anthraquinone and 200 parts of hydrogen fluoride there is obtained in a manner similar to that described in Example 1 the 3-chloro-2-trifluoromethyl-anthraquinone in a yield of about 85 per cent of the theoretical yield. The product melts at 208° C.–210° C.

(4) From 1.4-dichloro-2-trichloromethyl-anthraquinone dissolved in trichlorobenzene and hydrogen fluoride there is obtained according to the process of Example 2 the 1.4-dichloro-2-trifluoromethyl-anthraquinone melting at 140° C.–

142° C. The product is obtained in a yield of about 80 per cent of the theoretical yield.

(5) In a manner similar to that described in Example 1 there are obtained from 395 parts of 5.8 - dichloro -2- trichloromethyl - anthraquinone and 250 parts of hydrogen fluoride 310 parts of 5.8 - dichloro -2- trifluoromethyl - anthraquinone melting at 190° C.–191° C.; this corresponds to a yield of 90 per cent of the theoretical yield.

(6) From 360 parts of 4-chloro-2-trichloromethyl-anthraquinone and 200 parts of hydrogen fluoride there is obtained in a manner similar to that described in Example 1, the 4-chloro-2-trifluoromethyl-anthraquinone in a yield of about 80 per cent of the theoretical yield. The melting point of the product is at 159° C.–161° C.

I claim:

1. Products selected from the class consisting of 2-trifluoro methyl-anthraquinone and its chlorine substitution products.

2. 2-trifluoro methyl-anthraquinones having attached to the nucleus up to two chlorine atoms as the other only substituents.

3. 3-chloro -2- trifluoromethyl - anthraquinone melting at 208° C.–210° C.

4. 5.8-dichloro -2- trifluoromethyl - anthraquinone melting at 190° C.–191° C.

5. 4-chloro-2-trifluoro methyl - anthraquinone melting at 159° C.–161° C.

6. The process which comprises heating at a temperature of about 100° C. to 200° C. in a pressure vessel at a pressure of about 10–20 atmospheres a compound of the group consisting of 2-trichloro methyl-anthraquinone and its chlorine substitution products together with anhydrous hydrogen fluoride and allowing the hydrogen chloride formed during the reaction to escape.

OTTO SCHERER.